United States Patent [19]

More et al.

[11] 4,178,509

[45] Dec. 11, 1979

[54] SENSITIVITY PROPORTIONAL COUNTER WINDOW

[75] Inventors: Keith A. More; Donald R. Bianco, both of Ann Arbor, Mich.

[73] Assignee: The Bendix Corporation, Teterboro, N.J.

[21] Appl. No.: 911,733

[22] Filed: Jun. 2, 1978

[51] Int. Cl.[2] .......................... G01T 1/18; H01J 35/00

[52] U.S. Cl. ....................................... 250/374; 313/59

[58] Field of Search ........ 250/374, 375, 505, 213 VT; 313/59, 55

[56] References Cited

U.S. PATENT DOCUMENTS

| | | | |
|---|---|---|---|
| 2,617,953 | 11/1952 | Brasch | 313/59 |
| 2,665,391 | 1/1954 | Bleeksma | 313/59 |
| 3,296,478 | 1/1967 | Ichinokawa | 313/59 |
| 3,617,788 | 11/1971 | Goorissen et al. | 313/59 |

*Primary Examiner*—Davis L. Willis
*Attorney, Agent, or Firm*—Anthony F. Cuoco; William F. Thornton

[57] ABSTRACT

An improved sealed proportional counter window for an X-ray spectrometer includes a metallic foil having high X-ray transmission characteristics and having an ultra thin plastic coating thereon for sealing the inherent porosity of the metallic foil. The plastic coated foil is suitably supported by an arrangement which provides a relatively high percentage of unobstructed counter window area.

6 Claims, 3 Drawing Figures

SENSITIVITY PROPORTIONAL COUNTER WINDOW

FIELD OF THE INVENTION

This invention relates generally to X-ray spectrometers and particularly to windows for sealed proportional counters used in X-ray spectrometers. More particularly, this invention relates to windows of the type described having improved sensitivity for detecting X-rays of lower energy than has heretofore been possible.

SUMMARY OF THE INVENTION

Spectrometers are the principal means for measuring X-ray spectra. The basic operating principles of X-ray spectrometers are described at Pages 252–254, and particularly in FIG. 10.9, of the text *Scanning Electronic Microscopy*, by Oliver C. Wells, published by McGraw Hill Book Company in 1974.

The spectrometers described may use sealed gas proportional counters which include windows for passing X-rays which are ultimately detected for identifying unknown substances. Sealed proportional counters of the type described are well known in the art and are described in the text *Scanning Electron Microscopy*, Supra, and also at Page 58 and particularly in FIG. 5.1 of the text *Electron Probe Microanalysis* by L. L. Birks and published by John Wiley and Sons in 1971.

Prior to the present invention the X-rays have been detected and measured by sealed gas proportional counters having beryllium windows. In this regard, it is well known that beryllium has unique properties for such counter windows in that it has high X-ray transmission capability. This is due to a low cross section availability resulting from the low atomic number and density of the metal. Additionally, beryllium provides the mechanical properties of rigidity and strength and has a low permeability to gases.

Beryllium does have a disadvantage, however, in that it is not readily malleable. Thin sheets of beryllium foil must be forged or cast using powder metallurgy techniques. Production of vacuum-tight foils (as is a necessity in sealed gas proportional counter windows) larger than a few square centimeters has not been accomplished with foils thinner than about 26 microns due to the inherent porosity of such foils.

Parylene, a plastic coating material manufactured by the Union Carbide Company, has been used for X-ray windows. Parylene windows are vacuum tight and can be as thin as 0.2 micron. While these windows have high X-ray transmission capability, they suffer from poor strength. The present invention utilizes the rigidity and strength characteristics associated with metals (beryllium) and the vacuum sealing properties associated with plastic coatings (Parylene) to provide thin proportional counterwindow for detection of X-rays of lower energy than previously possible.

The significance of the present invention will best be understood when it is considered that proportional counter windows constructed of beryllium of the aforenoted thickness (26 microns) are insensitive to X-rays below 2 keV. This insensitivity prevents the detection of elements with atomic numbers below calcium. Upon a reduction of the window thickness to 13 microns (½ mil), as is possible in accordance with the present invention, then all elements with atomic numbers down to silicon can be detected. This includes the important aluminum and magnesium silicates, which significantly enhances the value of the equipment for scientific investigations and the like.

SUMMARY OF THE INVENTION

This invention contemplates a window for a sealed proportional counter used in X-ray spectrometry and including rigid means for supporting a thin metallic foil having an ultra thin plastic coating applied thereto. The rigid supporting means may include a pair of grids, with the plastic coated foil sandwiched therebetween, or a single grid disposed on top of the foil, whereby a high percentage of active unobstructed window area is provided. The supporting means and the plastic coated metallic foil may be suitably joined and the assembly so provided supported in a proportional counter housing, or the like. The structural arrangement described provides a proportional counter having a sensitivity for detection of X-rays of lower energy than has heretofore been possible.

DESCRIPTION OF THE INVENTION

Figure 1:
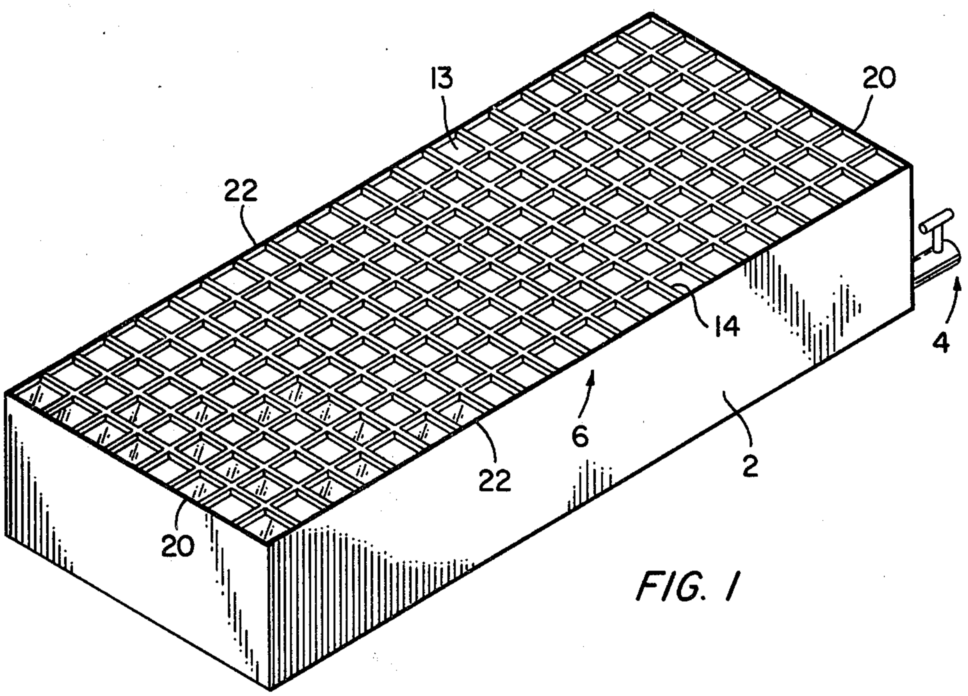
FIG. 1 is a diagrammatic representation of a proportional counter assembly in accordance with the invention.

A counter assembly such as may be used with an X-ray spectrometer system and incorporating the improved window of the invention, is shown in FIG. 1 as including a housing 2 which is shown, for purposes of illustration as rectangular in shape. Housing 2 has a vacuum tight tube and valve assembly 4 at one end thereof, first for vacuum evacuation of the counter assembly and then for backfilling with special gases as required and explained in *Scanning Electron Microscopy* and *Electron Probe Microanalysis*, Supra, and as is otherwise well known in the art.

Housing 2 is fabricated of aluminum or magnesium and internally lined with thin sheets of beryllium. The top of the housing supports the novel window of the invention designated generally by the numeral 6 and constructed as will be next explained. Only as much of the counter assembly as is necessary for illustrating the present invention is shown and described.

Figure 2:
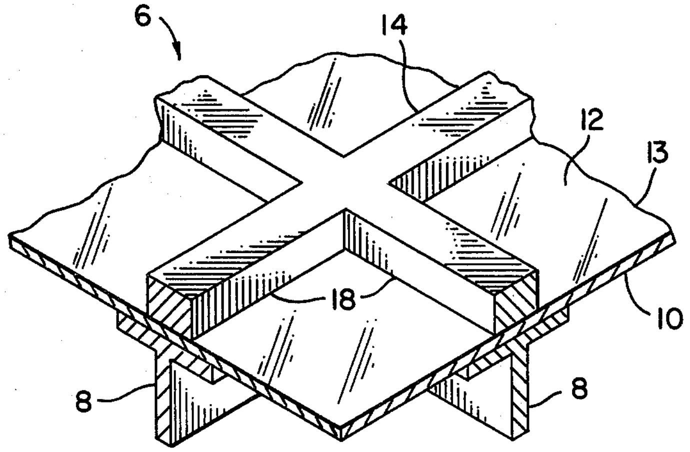
FIG. 2 is a diagrammatic representation showing the details of a proporational counter window used in the assembly of FIG. 1.
Figure 3:
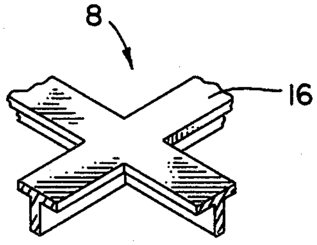
FIG. 3 is a diagrammatic representation showing a cross section of a supporting grid according to the invention.

Window 6 may include an integral array of small T-sectional bars forming a rigid grid designated by the numeral 8. The particular cross-section of the bars is as shown in FIGS. 2 and 3. Grid 8 is preferably fabricated from beryllium but boron may be used as well. In this connection it is noted that the described T-shaped cross-section, while importing strength characteristics to grid 8, is not necessary for the purposes of the invention. The cross-section may well be I-shaped, square, or such other shape as may be necessary or required to serve the purposes of the invention, and the T-shaped cross-section is thus described for illustrative purposes only.

A thin beryllium sheet or foil 10 is disposed on top of grid 8. In this connection it is noted that beryllium foil 10 is in the nature of 13 microns thick, but has low vacuum integrity due to the inherent porosity of beryllium foil of that thickness.

In order to overcome this porosity, the upper surface of beryllium sheet 10 is coated with a film of Parylene-N material, 0.2 micron thick and designated by the numberal 12 to provide a coated foil 13. Parylene-N is of the thermoplastic polymer family, i.e., poly-para-xylylene. The material exhibits excellent mechanical, electrical and thermal properties and is free of chlorine which would interfere with the passage of low energy X-rays. Hence the 0.2 micron Parylene-N film is essentially X-ray transparent and its principal purpose is to provide a tough, non-porous coating for sealing the porosity of the beryllium foil. The material and its method of application is described in a brochure entitled *Parylene Conformal Coatings* published by the Union Carbide Company, New York, New York (Copyright 1971).

An integral array of small square sectioned bars forms a rigid rectangular grid designated by the number 14. Grid 14, which may be of beryllium or boron as is grid 8, is disposed over coated foil 13. The bars of grid 14 coincide in spacing with the bars of grid 8. The structural arrangement including grid 8, grid 14 and coated foil 13 sandwiched therebetween is best shown in FIG. 2.

Coated foil 13 is about two inches by five inches, which has been found in practicing the invention to be about the largest practical size beryllium foil that may be fabricated of the aforenoted thickness, and is thus a major factor in determining the dimensions of the counter assembly as shown in FIG. 1.

It will be understood, therefore, from the invention so far described, that the combination of the two materials, whereby beryllium provides the required physical characteristics and the Parylene-N coating provides a vacuum tight seal to insure the vacuum integrity of the counter window, results in a thin window capable of measuring lower energy X-rays than has heretofore been possible. The use of rigid grids 8 and 14 provide required support for the otherwise fragile window, while providing a relatively large unobstructed window area.

With the components of the proportional counter window as described, i.e., grid 8, grid 14 and coated foil 13 sandwiched therebetween, it may be desirable to join the grids and coated foil to provide an integral window unit.

This may be accomplished by methods well known in the art, several of which will be herein referred to by way of illustration. For example, a high vacuum ceramic cement manufactured by Varian Corporation, Palo Alto, California, and designated as "Torr Seal" may be used. A thin bead of such cememt is laid on the top side 16 of grid 8 (FIG. 3) and on the bottom side of grid 14 (not shown). Coated foil 13 is placed between grids 8 and 14 and the cemented assembly is cured at an elevated temperature to provide the aforenoted integral unit.

Alternatively, the three components may be placed in a suitable jig in the vacuum system of an electron beam welder as is well known in the art and a very low energy bead of weld applied along the edges 18 of the bars (FIG. 2) of grid 14, penetrating coated foil 13 and adjering to top 16 of grid 18.

Again, alternatively, the three components may be placed into a jig and a small bead of weld may be applied as aforenoted by means of laser welding.

Other suitable joining methods may be used as well to satisfy the purposes of the invention as will be understood by those skilled in the art.

With the components of the window so joined, grid 14 and/or grid 8 may be joined to the top edges 20 and 22 of rectangular housing 2 by one of the aforenoted methods, i.e., cementing, electron beam welding or laser beam welding, as the case may be, to provide the counter assembly as shown in FIG. 1.

It will be understood that in certain circumstances, depending on the size of housing 2, it will not be necessary to join grid 8 to coated foil 13 or to grid 14 as aforenoted. Under these circumstances grid 8 is joined to housing 2 by one of the aforenoted methods and coated foil 18, joined to grid 14, is disposed within the top of housing 2 on grid 8 so as to be supported thereby. Further, depending on the size of the housing and the particular application involved, grid 8 may not be necessary at all for support, and in this case coated foil 13 may be joined to grid 14 and the grid joined to housing 2 by one of the aforenoted joining methods.

It will now be seen from the aforenoted description of the invention that the mechanical properties of beryllium and the porosity sealing properties of Parylene-N have been incorporated into the structural features of the invention to provide a window having high X-ray transmission capability. This feature, together with the supporting arrangement including grid 14, with or without grid 8, as the case may be, provides a proportional counter window for the purposes described which is more sensitive for detecting lower energy X-rays than has been heretofore possible, while providing a relatively high unobstructed counter window area.

What is claimed is:

1. A window for a proportional counter used in an X-ray spectrometer, comprising:

a thin metallic foil having a high X-ray transmission capability for passing a relatively wide range of X-ray spectra;

the thin metallic foil having a thin plastic coating thereon which is essentially X-ray transparent;

the proportional counter including a housing having an open area; and means supporting the thin plastic coated metallic foil and supported in the open area of the housing for providing a proportional counter window having a relatively large unobstructed window area.

2. A window for a proportional counter as described by claim 1, wherein:

the supporting means includes first and second grids, each of which includes an integral array of bars in corresponding spaced relation; and the thin plastic coated metallic foil is sandwiched between the first and second grids and covers the open portions thereof.

3. A window for a proportional counter as described by claim 2, wherein:

the thin plastic coated metallic foil is joined to the first and second grids; and at least one of said grids is disposed in the open area of the housing and joined to the housing.

4. A window for a proportional housing as described by claim 2, wherein:

one of the first and second grids is disposed in the open area of the housing and joined to the housing; and the thin plastic coated metallic foil is joined to the other of the first and second grids and is supported in the open area of the housing by the one grid.

5. A window for a proportional counter as described by claim 1, wherein:

the supporting means includes a grid;

the thin plastic coated metallic foil is joined to the grid and covers the open portion thereof; and the grid is disposed in the open area of the housing and joined to the housing.

6. A window for a proportional counter as described by claim 1, wherein:

the thin metallic foil is inherently porous; and the thin plstic coating seals the porous metallic foil.

* * * * *